United States Patent [19]

Rolando

[11] Patent Number: 4,556,799
[45] Date of Patent: Dec. 3, 1985

[54] MOTION SENSING APPARATUS WITH VARIABLE THRESHOLD

[76] Inventor: John L. Rolando, 724 S. Beacon Ave., Apt. 5, Los Angeles, Calif. 90017

[21] Appl. No.: 374,184

[22] Filed: May 3, 1982

Related U.S. Application Data

[63] Continuation of Ser. No. 135,299, Mar. 3, 1980, abandoned.

[51] Int. Cl.[4] ............................................. G01F 23/00
[52] U.S. Cl. ...................................... 250/577; 33/366; 250/231 R
[58] Field of Search ................... 250/231 R, 573, 577; 33/366; 73/653, 655

[56] References Cited

U.S. PATENT DOCUMENTS

| | | | |
|---|---|---|---|
| 2,427,902 | 9/1947 | Clifton et al. | 33/366 X |
| 3,225,450 | 12/1965 | Stanley | 33/366 X |
| 3,822,944 | 7/1974 | Hopkins et al. | 33/366 X |
| 4,134,022 | 1/1979 | Jacobsen | 250/577 |

Primary Examiner—Edward P. Westin
Attorney, Agent, or Firm—Harlan P. Huebner

[57] ABSTRACT

Motion sensing apparatus comprise a mercury globule supported on an opaque concave surface having a transparent window at its lowest part. A photocell is exposed to light passing through the window as it is varied by movement of the mercury. The photocell output is passed to one terminal of a comparator, the other terminal of which is energized through a variable resistor by means of which the sensitivity of the comparator to the photocell input may be varied. The comparator output controls pulse generating apparatus which produces output pulses of controllable length or, alternatively, an electronically latched continuous output either of which may control mechanism of any kind.

2 Claims, 2 Drawing Figures

MOTION SENSING APPARATUS WITH VARIABLE THRESHOLD

This application is a continuation of application Ser. No. 135,299, filed Mar. 3, 1980, now abandoned.

BACKGROUND OF THE INVENTION

1. Field of the Invention

The present invention relates to motion sensing apparatus and more particularly to improvements including a novel sensor and means for variably controlling the sensitivity of such apparatus.

2. Description of the Prior Art

While a variety of motion sensing devices have been developed for applications ranging from stopping a vehicle engine upon impact to measuring accelerations with sophisticated electronic equipment, there is an unfilled need for a simple and economical apparatus for sensing the motion of a platform on which it is mounted and which may be adjusted to very its sensitivity so as to adapt it to a wide variety of applications such as, for example, to shut off gas and electronic supplies upon occurrence of an earthquake; to sound an alarm and/or interrupt power to machinery when excessive vibration occurs, etc.

SUMMARY OF THE INVENTION

The motion of a platform upon which the sensor of the present invention is mounted is sensed by a device comprising a substantially opaque inertial element movably supported upon a concave surface which also is substantially opaque except for a translucent window area at its lowest point. The inertial element is of such size as to cover at least a portion of the window area.

A light source and a photocell, shielded from light other than light from said source, are positioned on opposite sides of the window area so that upon movement of the inertial element over the window area of the amount of light reaching the photocell from the source will be varied.

Signal emitting means respond to variations in the amount of light reaching the photocell from the light source. The magnitude of the light variation capable of causing the signal emitting means to respond may be changed by adjustment of a threshold control means.

The emitted signal may be employed to actuate any of a variety of warning devices or to control mechanisms such as valves, etc.

DESCRIPTION OF THE PREFERRED EMBODIMENT

The motion sensing apparatus of the present invention includes a novel motion sensor and signal emitting means which comprises threshold control means adjustable to cause the signal emitting means to respond to different magnitudes of motion sensed by the sensor.

Figure 1:
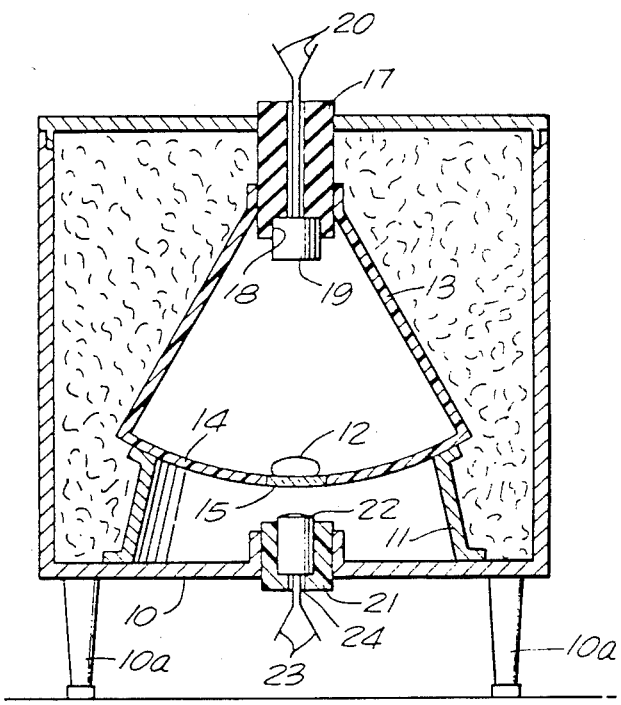
FIG. 1 is a view in section of a motion sensor forming a part of the apparatus of the present invention.

As shown in FIG. 1, the motion sensor comprises a packing filled container 10 constituting a base adapted for mounting, as by legs 10a, on a platform or device the motion of which is to be sensed. Mounted in the container-base 10 by ring 11 is an assembly comprising an opaque inertial element 12 disposed within a tubular opaque carrier 13 presenting at its lower end an interior concave upper surface 14 in the form of a portion of a sphere provided with a transparent central window 15 in its lowest part.

The inertial element 12 is, in the preferred embodiment illustrated and described, a globule of mercury of a size which covers a major part of the area of the window 15, but for certain uses it may be desirable to substitute a metal ball for the mercury globule and/or to size the inertial element to entirely cover the window.

The carrier 13 supports at its upper end a closure 17 of resilient material such as rubber. The closure 17 has a central opening 18 sized to receive and retain a light emitting diode 19 which, when energized from a source of power 27 via leads 20 to ground (see FIG. 2) projects light axially of the carrier 13 against the surface 14, window 15 and inertial element 12.

Secured to the lower end of the carrier 13, preferably removably, is a cup fitting 21 and positioned centrally within it, directly under the window 15, is a phototransistor 22. Its leads 23 pass through a grommeted hole 24 in the cup wall.

This arrangement is such that movement of the platform on which the base 10 is mounted will cause movement in any generally horizontal unrestricted direction of the carrier 13 and of the mercury globule 12 on the spherical surface 14 with respect to the window 15 and will thus change the amount of light from the source 19 which reaches the phototransistor 22. This produces a detectable output from the phototransistor which is employed to control signal emitting apparatus.

Figure 2:
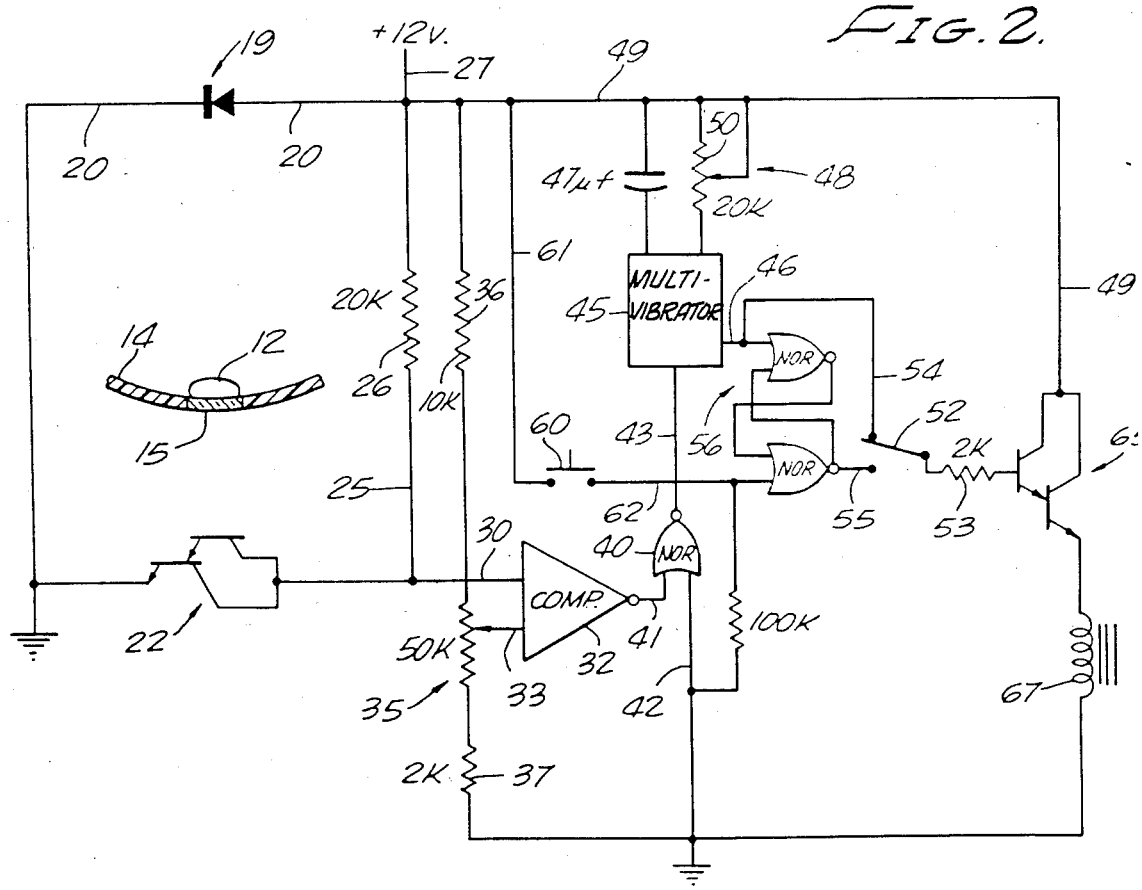
FIG. 2 is a circuit diagram showing the connection of the sensor of FIG. 1 to the threshold control means and signal emitting means of the present invention.

As shown in FIG. 2, the output of the phototransistor 22, which is energized via lead 25 connected through resistor 26 to power supply 27, passes through lead 30 to one input of a comparator 32; the other input of which is connected via lead 33 to the moving contact of a potentiometer 35 the winding of which is connected in a series with resistors 36 and 37 of a voltage divider network. The comparator 32 is a differential high gain amplifier which changes its output from high to low when the voltage of its input 30 rises above the voltage of its input 33. Thus, by adjusting the potentiometer 35 to increase the voltage input via lead 33, a greater voltage input is required on lead 30 to change the output of comparator 32 from high to low. This arrangement, therefore, constitutes a threshold control means whereby the amount of light falling on the phototransistor 22 which is required to produce a change of state of comparator 32 may be increased or decreased as desired.

Signal emitting means are controlled by the comparator 32 to provide a signal pulse of adjustable duration upon a change of state of the comparator. This means comprises a NOR gate 40 one input of which is connected by lead 41 to the output of comparator 32 and the other input of which is grounded through lead 42. This arrangement is such that when the output of comparator 32 goes from high to low, a pulse is produced at the output of the NOR gate 40.

The output of NOR gate 14 is connected via lead 43 to a monostable or "one-shot" multivibrator 45 which, in response to an input pulse on lead 43, emits a pulse on lead 46, the duration of which is controlled by a resistor-capacitance network 48 interposed between the multivibrator 45 and a lead 49 connected via lead 27 to the power supply. The pulse duration may be varied by adjustment of the variable resistor 50, and the limits of its duration established by selecting appropriate values for the resistance and the capacitance employed. The values shown on the drawing for these as well as other components are merely typical values.

Means are provided for selectively determining whether the output pulse of the multivibrator 45 will be employed directly to actuate a device to be controlled by the motion sensing apparatus of the present invention or whether it will be employed to set a switching mechanism from one state to another for actuating a device. This means comprises a double pole single throw switch 52 which in one position connects its output through resistor 53 via lead 54 directly to the output 46 of multivibrator 45. In its other position switch 52 connects its output via lead 55 to the output of a bistable flipflop 56 which receives its input from the multivibrator 45 via lead 46. A reset switch 60 for flipflop 56 applies an input from the power 27 via leads 49, 61 and 62 to the flipflop to reset it from a high to a low output.

This arrangement is such that, when switch 52 engages the lead 55 contact, an output pulse from the multivibrator 45 will invert the flipflop 56 to maintain an output voltage at the output of switch 52, independently of the initiating pulse, until the reset switch 60 is closed.

In the preferred embodiment illustrated and described the output pulse from switch 52 through resistor 53 is employed to turn on a transistor switching means 65 to apply power from the source 27 via lead 49 to the winding of a solenoid 67 which may actuate any desired type of such device, such as a fluid control valve, or act merely as a reply to control other mechanisms.

While the preferred embodiment of the invention has been described herein, it will be understood that the same is susceptible of modification in many particulars and that the invention is not to be taken as limited to the embodiment illustrated and described.

I claim:

1. A motion sensor comprising:
a substantially opaque inertial element movably supported upon a carrier for said element presenting a substantially opaque, concave upper spherical surface having a translucent window area at its lowest part, said inertial element being of such size as to cover at least a portion of said window area and capable of omnidirectional uninterrupted movement on said concave spherical surface;
a light source;
a single phototransistor shielded from light other than light from said light source, said light source and said phototransistor being positioned on opposite sides of said window area and aligned one with the other with said inertial element interposed therebetween, and said light source and phototransistor being interchangeable on opposed sides of said window area, whereby upon generally unrestricted directional movement of said inertial element over said window area the amount of light passing through said window reaching said phototransistor from said light source will be varied;
signal emitting means including phototransistor controlled means for emitting a signal in response to a change in the amount of light reaching said phototransistor, said phototransistor controlled means comprising a differential comparator having two inputs, one of said inputs being responsive to the output of said phototransistor and the other of said outputs including a potentiometer for varying the potential applied thereto, and a monostable multivibrator controlled by said differential comparator upon a change of state from high to low thereof to emit a pulse; and
adjustment means to vary the duration of a pulse emitted by said multivibrator.

2. A motion sensor as defined in claim 1 including means settable by a pulse emitted by said multivibrator to provide a continuous output corresponding to said pulse.

* * * * *